United States Patent
Lin et al.

(10) Patent No.: US 8,360,355 B2
(45) Date of Patent: Jan. 29, 2013

(54) WING-TO-BODY FAIRING WITH SPRAY-ON FOAM AND NOISE REDUCTION METHOD

(75) Inventors: Juhn-Shyue Lin, Renton, WA (US);
Herbert L. Hoffman, Seattle, WA (US);
Hugh W. Poling, Seattle, WA (US)

(73) Assignee: The Boeing Company, Chicago, IL (US)

( * ) Notice: Subject to any disclaimer, the term of this patent is extended or adjusted under 35 U.S.C. 154(b) by 91 days.

(21) Appl. No.: 12/850,036

(22) Filed: Aug. 4, 2010

(65) Prior Publication Data

US 2012/0032024 A1 Feb. 9, 2012

(51) Int. Cl.
*B64C 1/40* (2006.01)

(52) U.S. Cl. ........ 244/1 N; 244/119; 244/120; 244/121; 244/123.5

(58) Field of Classification Search .................. 244/1 N, 244/119, 120, 121, 123.5, 133
See application file for complete search history.

(56) References Cited

U.S. PATENT DOCUMENTS

| | | | | |
|---|---|---|---|---|
| 4,687,691 A | * | 8/1987 | Kay | 428/73 |
| 5,542,626 A | * | 8/1996 | Beuck et al. | 244/107 |
| 5,985,362 A | | 11/1999 | Specht et al. | |
| 6,722,611 B1 | | 4/2004 | Wu et al. | |
| 7,578,468 B2 | * | 8/2009 | Drost | 244/117 R |
| 8,056,850 B2 | * | 11/2011 | Lin et al. | 244/1 N |
| 2006/0145006 A1 | | 7/2006 | Drost | |
| 2006/0280927 A1 | * | 12/2006 | Albright et al. | 428/304.4 |
| 2008/0149767 A1 | * | 6/2008 | Burgess | 244/119 |
| 2009/0078820 A1 | | 3/2009 | Lin et al. | |
| 2009/0184200 A1 | * | 7/2009 | Lin et al. | 244/1 N |

FOREIGN PATENT DOCUMENTS

EP 0435650 B1 7/1994

OTHER PUBLICATIONS

European Patent Office; Extended Search Report for EP Application No. 11176204.3 dated Aug. 18, 2012.

* cited by examiner

*Primary Examiner* — Philip J Bonzell
(74) *Attorney, Agent, or Firm* — Parsons Behle & Latimer

(57) ABSTRACT

A fairing includes a fairing body having a fairing interior and an interior surface and a spray-on insulation foam layer provided on the interior surface of the fairing body.

16 Claims, 3 Drawing Sheets

US 8,360,355 B2

WING-TO-BODY FAIRING WITH SPRAY-ON FOAM AND NOISE REDUCTION METHOD

TECHNICAL FIELD

The disclosure generally relates to wing to body fairings in aircraft. More particularly, the disclosure relates to a wing to body fairing with foam which reduces vibration, fatigue and cabin noise in an aircraft and a method of reducing cabin noise or reducing panel vibration in an aircraft.

BACKGROUND

In modern commercial aircraft, heavy insulation blankets may be placed on wing to body fairings to reduce cabin noise to acceptable levels by Clamping vibration of the wing to body fairing panels. However, insulation blankets may contribute excessive weight to the fairings. Moreover, insulation blankets may not be effective in Clamping vibration of the fairing panels during operation of the aircraft.

Therefore, a wing to body fairing with foam which reduces vibration, fatigue and cabin noise in an aircraft and a method of reducing cabin noise or reducing panel vibration in an aircraft are needed.

SUMMARY

The disclosure is generally directed to a fairing with spray-on foam, which reduces vibration, fatigue and cabin noise in an aircraft. An illustrative embodiment of the fairing includes a fairing body having a fairing interior and an interior surface and an insulating foam layer provided on the interior surface of the fairing body.

The disclosure is further generally directed to a method of reducing cabin noise or reducing panel vibration in an aircraft. An illustrative embodiment of the method includes providing a fairing having a fairing body with an interior surface, providing an insulating foam, applying the spray-on insulation foam to the interior surface of the fairing body and installing the fairing on an aircraft.

In some embodiments, the method of reducing cabin noise or reducing panel vibration in an aircraft may include providing a fairing having a fairing body including a plurality of fairing panels with an interior surface; providing a spray-on insulation foam; spraying the spray-on insulation foam on the interior surface of the fairing body; and installing the fairing on an aircraft.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
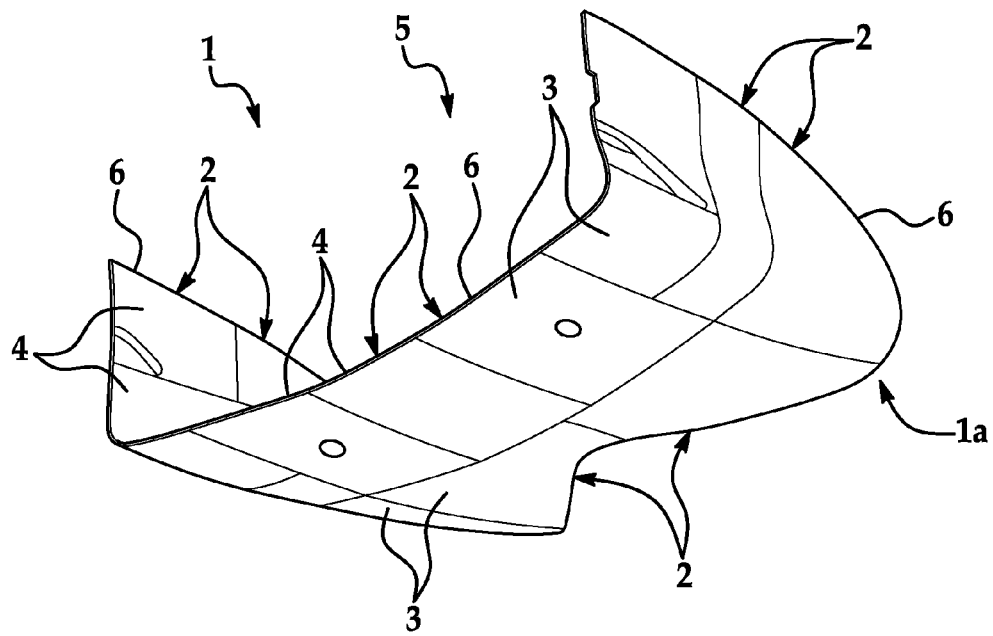
FIG. 1 is a bottom perspective view of an illustrative embodiment of a wing to body fairing with spray-on foam.
Figure 2:
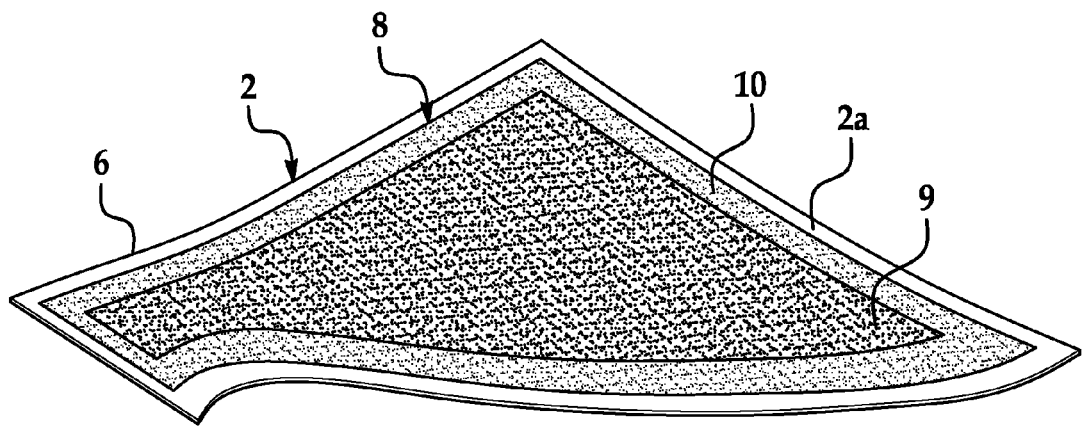
FIG. 2 is a perspective view of a portion of a fairing panel of the wing to body fairing, with a spray-on foam layer deposited on the fairing panel.
Figure 2A:
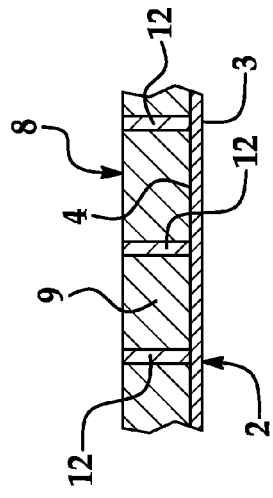
FIG. 2A is a cross-sectional view of a portion of a fairing panel of the wing to body fairing, with insulation pins extending from the interior panel surface and a spray-on foam layer provided on the insulation pins and the interior panel surface of the fairing panel.

Referring initially to FIGS. 1-2A, an illustrative embodiment of the wing to body fairing with foam, hereinafter fairing, is generally indicated by reference numeral 1. In some embodiments, the fairing 1 may be a wing to body fairing (WTBF) of a commercial aircraft, for example and without limitation. The fairing 1 may include a fairing body 1a having a fairing interior 5. In some embodiments, the fairing body 1a may have multiple fairing panels 2 which are assembled into the fairing body 1a according to the knowledge of those skilled in the art. Each fairing panel 2 may have an exterior panel surface 3 which generally faces away from the fairing interior 5 of the fairing body 1a and an interior panel surface 4 which generally faces the fairing interior 5 of the fairing body 1a. The fairing body 1a may have a fairing edge 6.

Figure 1A:
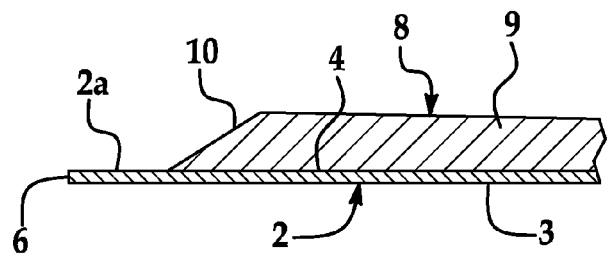
FIG. 1A is a cross-sectional view of a portion of a fairing panel of the wing to body fairing, with a spray-on foam layer provided on an interior panel surface of the fairing panel.

Referring to FIG. 1a, at least one insulation foam layer 8 may be sprayed on the interior panel surfaces 4 of the fairing panels 2 of the fairing body 1a. In some embodiments, the insulation foam layer 8 may be closed cell polyurethane spray-on insulation foam which is sprayed onto the interior panel surfaces 4 of the fairing panels 2. A polyurethane foam which is suitable for the spray-on insulation foam layer 8 is TIGER FOAM® which can be obtained from Commercial Thermal Solutions, Inc. of Spring Lake, N.J. (www.tiger-foam.com). In some embodiments, the insulation foam layer 8 may be applied to the interior panel surfaces 4 of the fairing panels 2 using an alternative application method. For example and without limitation, the insulation foam layer 8 may be a prepared foam layer which is applied to the interior panel surfaces 4 using adhesive and pressure. The insulation foam layer 8 may be contiguously applied to the interior panel surfaces 4 of the fairing panels 2. Therefore, the insulation foam layer 8 may be continuous generally throughout the entire surface area which is represented by the interior panel surfaces 4 of the fairing panels 2.

As shown in FIG. 1A, in some embodiments the insulation foam layer 8 may have a core foam portion 9. A tapered foam portion 10 may extend outwardly from the edges of the core foam portion 9 toward the fairing edge 6 of the fairing body 1a. Taper is used to control weight and enhance handling durability. Edges are not so important relative to center portion for foam benefit. A fairing flange 2a may extend between the tapered foam portion 10 and the fairing edge 6. The fairing flange 2a may facilitate attachment of the fairing body 1a to the structural elements (not shown) of an aircraft (not shown) according to the knowledge of those skilled in the art. The insulation foam layer 8 may be omitted from the fairing flange 2a. The insulation foam layer 8, which is a closed cell polyurethane foam, may have a density of about 1.75 lb/ft$^3$, or a density in the range between about 1.50 and about 2.0 lb/ft$^3$. In some embodiments, the core foam portion 9 of the insulation foam layer 8 may have a thickness of about 2 inches. The thickness of the tapered foam portion 10 may decrease from about 2 inches to 0 inches from the core foam portion 9 to the fairing flange 2a. The main feature is to eliminate corners that may interfere with the handling of the panel(s). Spray on foam insulation is typically not uniform in thickness upon application. Secondary machining to a specific thickness dimension is typically needed. In one embodiment the spray on foam may not be machined and the resulting thickness may range from 0.5 to 3 inches.

As shown in FIG. 2A, in some applications insulation pins 12 may be installed on the interior panel surface 4 of each fairing panel 2. The insulation pins 12 may ensure that the insulation foam layer 8 remains on each fairing panel 2 throughout the service life of the fairing panels 2 while also ensuring the transfer of vibration energy From panel to foam.

After the insulation foam layer 8 is applied to the interior panel surfaces 4 of the fairing panels 2, the fairing 1 may be installed on a commercial aircraft (not shown) according to the knowledge of those skilled in the art. During operation of the aircraft, the insulation foam layer 8 may reduce wing-to-body fairing vibration, fatigue and cabin noise by dissipating energy via a damping and mass effect.

Figure 3:
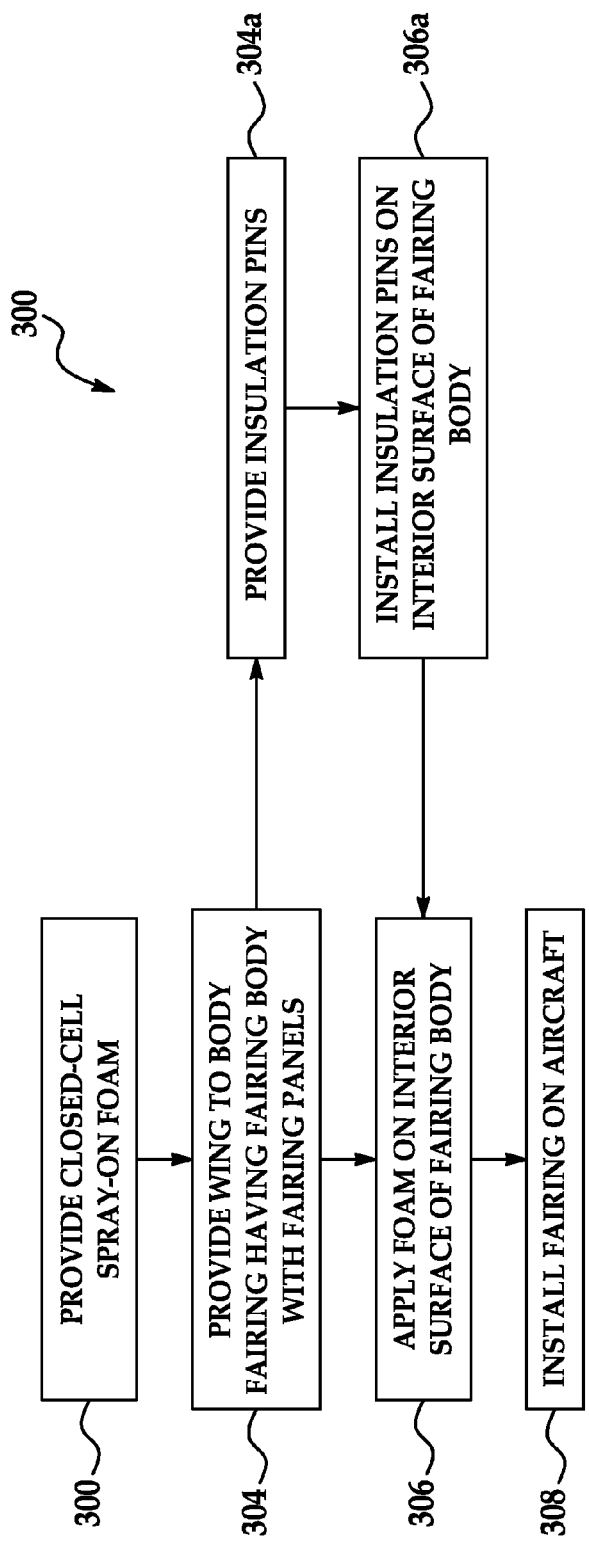
FIG. 3 is a flow diagram of an illustrative embodiment of a method of reducing cabin noise or reducing panel vibration in an aircraft.

Referring next to FIG. 3, a flow diagram 300 of an illustrative embodiment of a method of reducing cabin noise or reducing panel vibration in an aircraft is shown. In block 302, a foam may be provided. In some embodiments, the foam may be a closed cell polyurethane spray-on insulation foam, for example and without limitation. A polyurethane foam which is suitable for the spray-on foam layer is TIGER FOAM® which can be obtained from Commercial Thermal Solutions, Inc. of Spring Lake, N.J. (www.tigerfoam.com). In some embodiments, the foam may be a prepared foam layer. In block 304, a wing to body fairing having wing to body fairing panels may be provided. In block 306, the foam may be applied to the interior surfaces of the wing to body panels of the fairing by spraying or by application using adhesive and pressure to form an insulation foam layer on the interior surfaces of the wing to body panels. In some embodiments, the insulation foam layer may have a core foam portion and a tapered foam portion which extends from the edges of the core foam portion. In block 308, the fairing may be installed on an aircraft. During operation of the aircraft, the insulation foam layer may reduce wing-to-body fairing vibration, fatigue and cabin noise by dissipating energy via a damping effect.

In block 304a, in some embodiments insulation pins may be provided. In block 304b, the insulation pins may be installed on the interior surfaces of the wing body panels of the fairing prior to application of the foam on the interior surfaces of the wing to body fairing panels in block 306. The insulation pins may ensure that the insulation foam layer remains on each fairing panel throughout the service life of the fairing panels.

Figure 4:
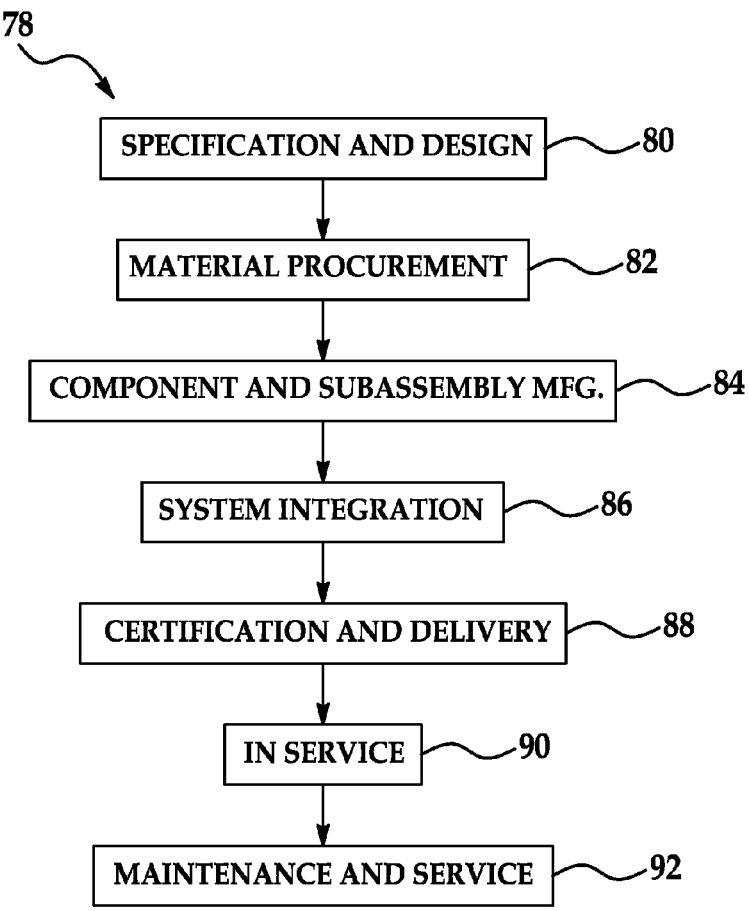
FIG. 4 is a flow diagram of an aircraft production and service methodology.
Figure 5:
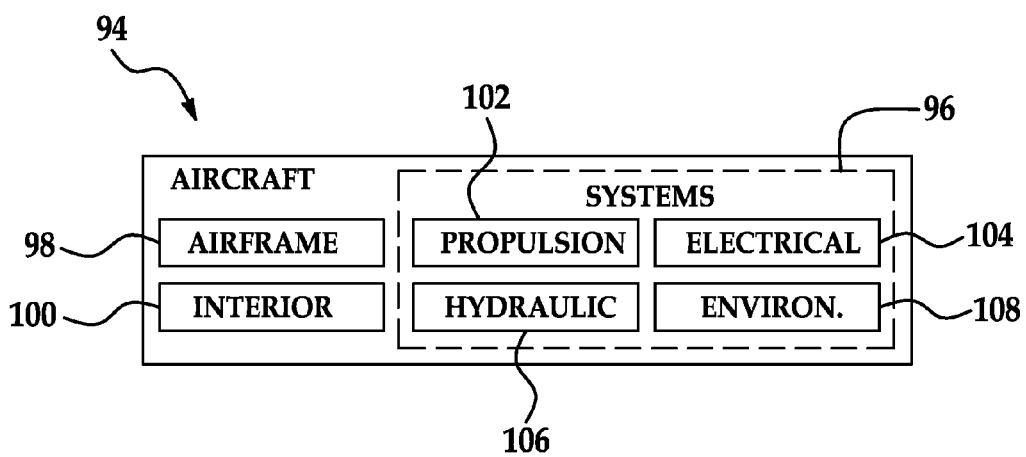
FIG. 5 is a block diagram of an aircraft.

Referring next to FIGS. 4 and 5, embodiments of the disclosure may be used in the context of an aircraft manufacturing and service method 78 as shown in FIG. 4 and an aircraft 94 as shown in FIG. 5. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

A further embodiment of method 78 may include receiving an assembled aircraft having fairing. The aircraft may further include a wing to body faring. The aircraft may further have a wing to body fairing where located aft of a wheel well. The aircraft may further have a wing to body fairing where located aft of a wheel well where the wheel well include a opening that exposes the interior of the wheel well to the exterior of the aircraft. The method may include removing a panel of the faring and applying a foam insulation to an interior surface of the panel. The method may further include machining the foam to a desired thickness and shape. The method may further include a spraying on a foam insulation material that bonds to the surface of the panel.

As shown in FIG. 5, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:
1. A fairing, comprising:
  a wing to body aircraft fairing including a plurality of fairing panels, each of the plurality of fairing panels having:
    an interior panel surface;
    an exposed, spray-on insulation foam layer on and in contact with said interior panel surface, the insulation foam layer including a core foam portion having a thickness and a tapered foam portion having a thickness less than the core foam portion extending from the core foam portion; and
  a fairing flange having a fairing edge extending from the fairing panel, the spray-on insulation foam layer being omitted on the fairing flange from the tapered foam portion to the fairing edge.

2. The fairing of claim 1 wherein said insulation foam layer comprises a closed cell polyurethane foam layer.

3. The fairing of claim 1 wherein the core foam portion has a thickness that ranges from 0.5 to 3 inches.

4. The fairing of claim 3 further comprising a plurality of insulation pins extending from the interior panel surface.

5. The fairing of claim 3 wherein said core foam portion has a thickness of about 2 inches.

6. The fairing of claim 5 wherein said tapered foam portion has a thickness of about 0 inches to about 2 inches.

7. A fairing, comprising:
a wing to body aircraft fairing including a plurality of fairing panels, each of the plurality of fairing panels having:
an interior panel surface;
a plurality of insulation pins extending from the interior panel surface;
a spray-on insulation foam layer on the insulation pins and on and in contact with the interior panel surface, the insulation pins being configured to retain the insulation foam layer on the fairing panel and to transfer vibration energy from the fairing panel to the insulation foam layer, and the insulation foam layer including a core foam portion having a thickness and a tapered foam portion having a thickness less than the core foam portion extending from the core foam portion; and
a fairing flange having a fairing edge extending from the fairing panel, the spray-on insulation foam layer being omitted on the fairing flange from the tapered foam portion to the fairing edge.

8. The fairing of claim 7 wherein the insulation foam layer is uncovered within a fairing interior.

9. The fairing of claim 7 wherein the insulation foam layer comprises a closed-cell polyurethane foam layer.

10. The fairing of claim 7 wherein the core foam portion has a thickness that ranges from 0.5 to 3 inches.

11. The fairing of claim 7 wherein said core foam portion has a thickness of about 2 inches.

12. The fairing of claim 7 wherein said tapered foam portion has a thickness of about 0 inches to about 2 inches.

13. An aircraft, comprising:
a wing to body fairing including a plurality of fairing panels, each of the plurality of fairing panels having:
an interior panel surface;
a plurality of insulation pins extending from the interior panel surface and having a length of about 2 inches; and
an unenclosed, closed-cell polyurethane insulation foam layer on the insulation pins and on the interior panel surface, the insulation pins being configured to retain the insulation foam layer on the fairing panel and to transfer vibration energy from the fairing panel to the insulation foam layer.

14. The aircraft of claim 13 wherein the insulation foam layer is on and in contact with the interior panel surface.

15. The aircraft of claim 13 wherein the insulation foam layer includes a core foam portion having a thickness of about 2 inches and a tapered foam portion having a thickness of about 0 to about 2 inches extending from the core foam portion.

16. The aircraft of claim 15 further comprising a fairing flange having a fairing edge extending from the fairing panel, the insulation foam layer being omitted on the fairing flange from the tapered foam portion to the fairing edge.

\* \* \* \* \*